US005976365A

United States Patent [19]
Petit

[11] Patent Number: 5,976,365
[45] Date of Patent: Nov. 2, 1999

[54] BIOMASS GROWTH CONTROL APPARATUS FOR FLUID BED BIOLOGICAL REACTOR

[75] Inventor: Peter J. Petit, Brookfield, Wis.

[73] Assignee: Envirex, Inc., Waukesha, Wis.

[21] Appl. No.: 08/195,397

[22] Filed: Feb. 14, 1994

Related U.S. Application Data

[63] Continuation-in-part of application No. 08/025,353, Feb. 25, 1993, Pat. No. 5,372,712.

[51] Int. Cl.$^6$ ....................................................... C02F 3/06
[52] U.S. Cl. ......................... 210/151; 210/194; 210/232; 210/268; 210/618
[58] Field of Search .................................. 210/122, 150, 210/151, 106, 256, 258, 259, 195.1, 195.3, 617, 618, 512.1, 519, 521, 540, 194, 268, 232

[56] References Cited

U.S. PATENT DOCUMENTS

| | | | |
|---|---|---|---|
| 306,169 | 10/1884 | Moseley | 210/540 |
| 306,171 | 10/1884 | Moseley | 210/540 |
| 1,147,881 | 7/1915 | Morris | 210/540 |
| 2,579,304 | 12/1951 | Crawford | 210/540 |
| 2,786,801 | 3/1957 | McKinley et al. | 196/53 |
| 3,523,889 | 8/1970 | Eis | 210/519 |
| 3,846,289 | 11/1974 | Jeris et al. | 210/618 |
| 3,855,120 | 12/1974 | Garbo | 210/151 |
| 3,879,287 | 4/1975 | Porter | 210/33 |
| 3,956,128 | 5/1976 | Turner | 210/150 |
| 3,956,129 | 5/1976 | Jeris et al. | 210/189 |
| 4,009,098 | 2/1977 | Jeris | 210/618 |
| 4,009,099 | 2/1977 | Jeris | 210/618 |
| 4,009,105 | 2/1977 | Jeris | 210/107 |
| 4,080,287 | 3/1978 | Conway et al. | 210/617 |
| 4,177,144 | 12/1979 | Hickey et al. | 210/86 |
| 4,182,675 | 1/1980 | Jeris | 210/618 |
| 4,197,201 | 4/1980 | Hjelmner et al. | 210/268 |
| 4,200,524 | 4/1980 | Levin | 210/618 |
| 4,202,774 | 5/1980 | Kos | 210/274 |
| 4,246,102 | 1/1981 | Hjelmner et al. | 210/739 |
| 4,250,033 | 2/1981 | Hickey et al. | 210/106 |
| 4,322,299 | 3/1982 | Scholten et al. | 210/794 |
| 4,412,924 | 11/1983 | Feather | 210/744 |
| 4,415,452 | 11/1983 | Heil et al. | 210/614 |
| 4,464,292 | 8/1984 | Owens et al. | 210/291 |
| 4,466,928 | 8/1984 | Kos | 261/76 |
| 4,469,599 | 9/1984 | Gros et al. | 210/610 |
| 4,477,393 | 10/1984 | Kos | 261/76 |
| 4,507,253 | 3/1985 | Wiesmann | 261/22 |
| 4,543,186 | 9/1985 | Weisenbarger et al. | 210/170 |
| 4,681,685 | 7/1987 | Sutton et al. | 210/151 |
| 4,707,252 | 11/1987 | Durot et al. | 210/618 |
| 4,749,654 | 6/1988 | Karrer et al. | 435/240.21 |
| 4,892,666 | 1/1990 | Paulson | 210/521 |
| 5,011,597 | 4/1991 | Canzoneri et al. | 210/104 |

FOREIGN PATENT DOCUMENTS

| | | |
|---|---|---|
| 0 367 756 | 2/1989 | European Pat. Off. . |
| 0 007 783 | 7/1989 | European Pat. Off. . |
| 2626868 | 8/1989 | France . |
| 653512 | 11/1937 | Germany . |
| 54-115560 | 9/1979 | Japan . |
| 0122997 | 7/1982 | Japan . |
| 62-79896 | 4/1987 | Japan . |

*Primary Examiner*—Christopher Upton
*Attorney, Agent, or Firm*—Michael Best & Friedrich LLP

[57] ABSTRACT

A reactor apparatus including a fluid bed reactor wherein liquid to be processed is conducted upwardly therein through a solid bed to fluidize the bed, the bed including particulate solids having biological material supported thereon, and the liquid forming an effluent head above the bed. The reactor apparatus also includes a control apparatus for removing excess biological material from the reactor. The control apparatus includes a tubular separator column which is emersed in the liquid effluent head, and a telescoping sludge valve that has a draw-off port communicating openly with the effluent head surface and that is adjustable to raise and lower the draw-off port relative to the effluent head surface to control the sludge withdrawal rate. The control apparatus also includes an agitator arrangement that withdraws bed particles from the separator column, shears excess biological material from those particles, and then returns the partially sheared particles and sheared biological material to the separator column. The agitator arrangement includes a throttling valve that is adjustable to vary the shear imported to the particles. The returned material is pumped tangentially into the separator column to induce hydrocyclonic action in the separator column.

10 Claims, 3 Drawing Sheets

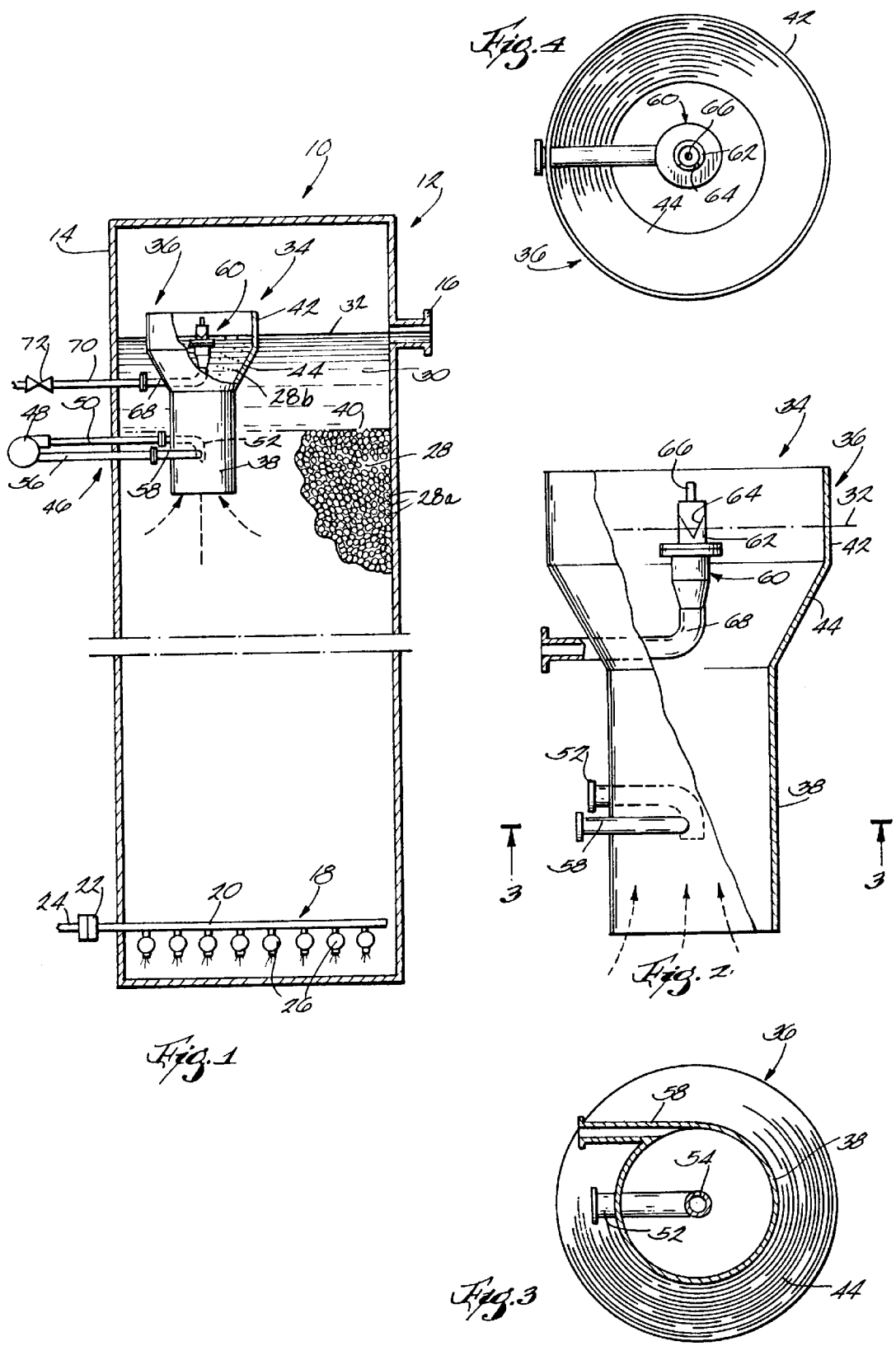

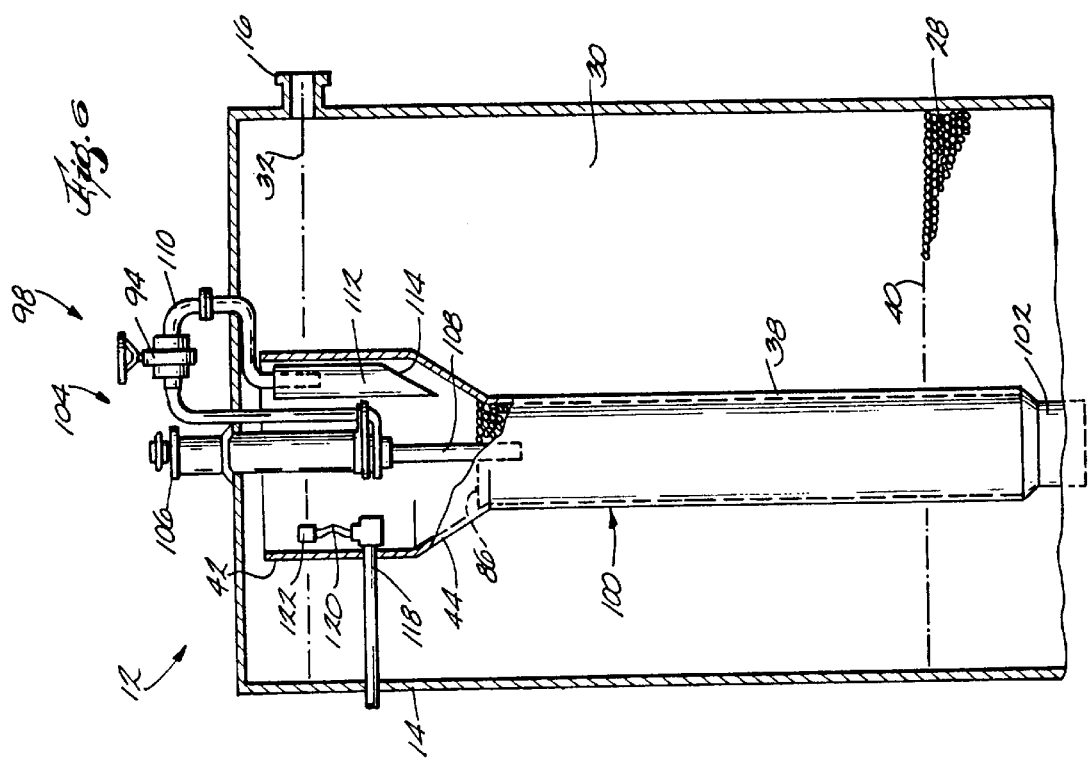
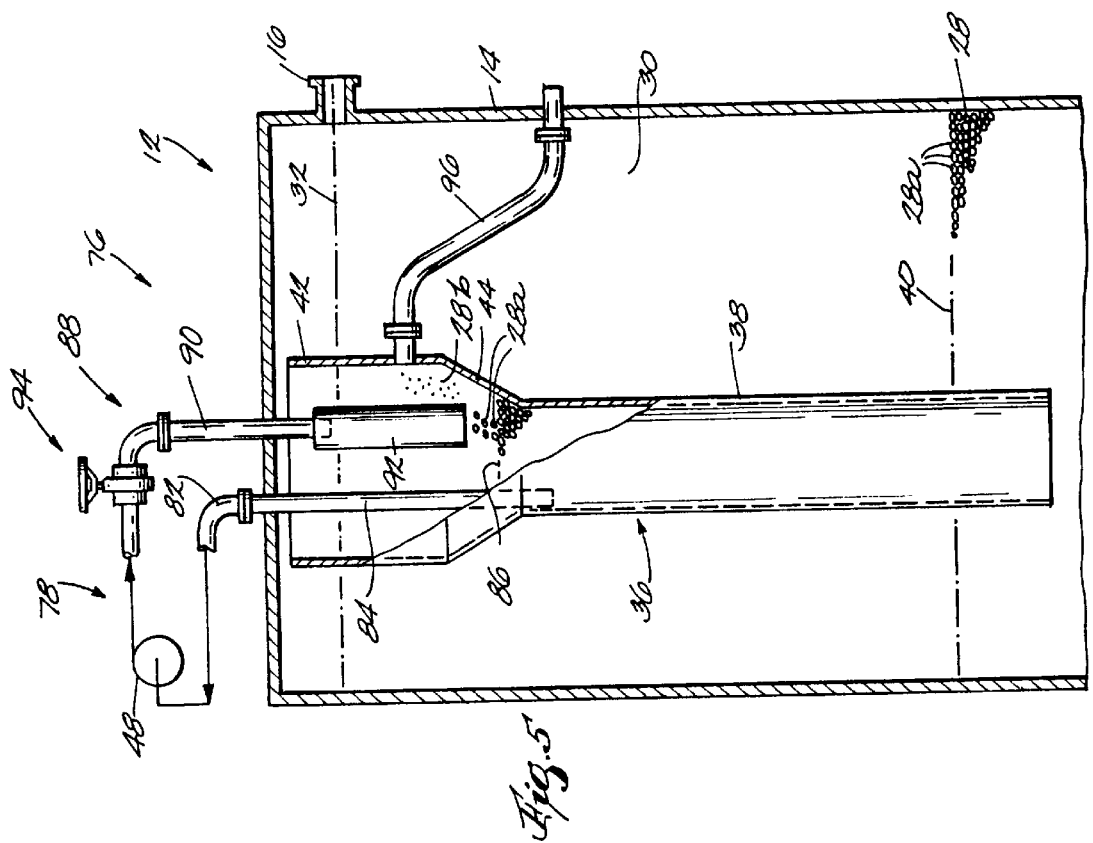

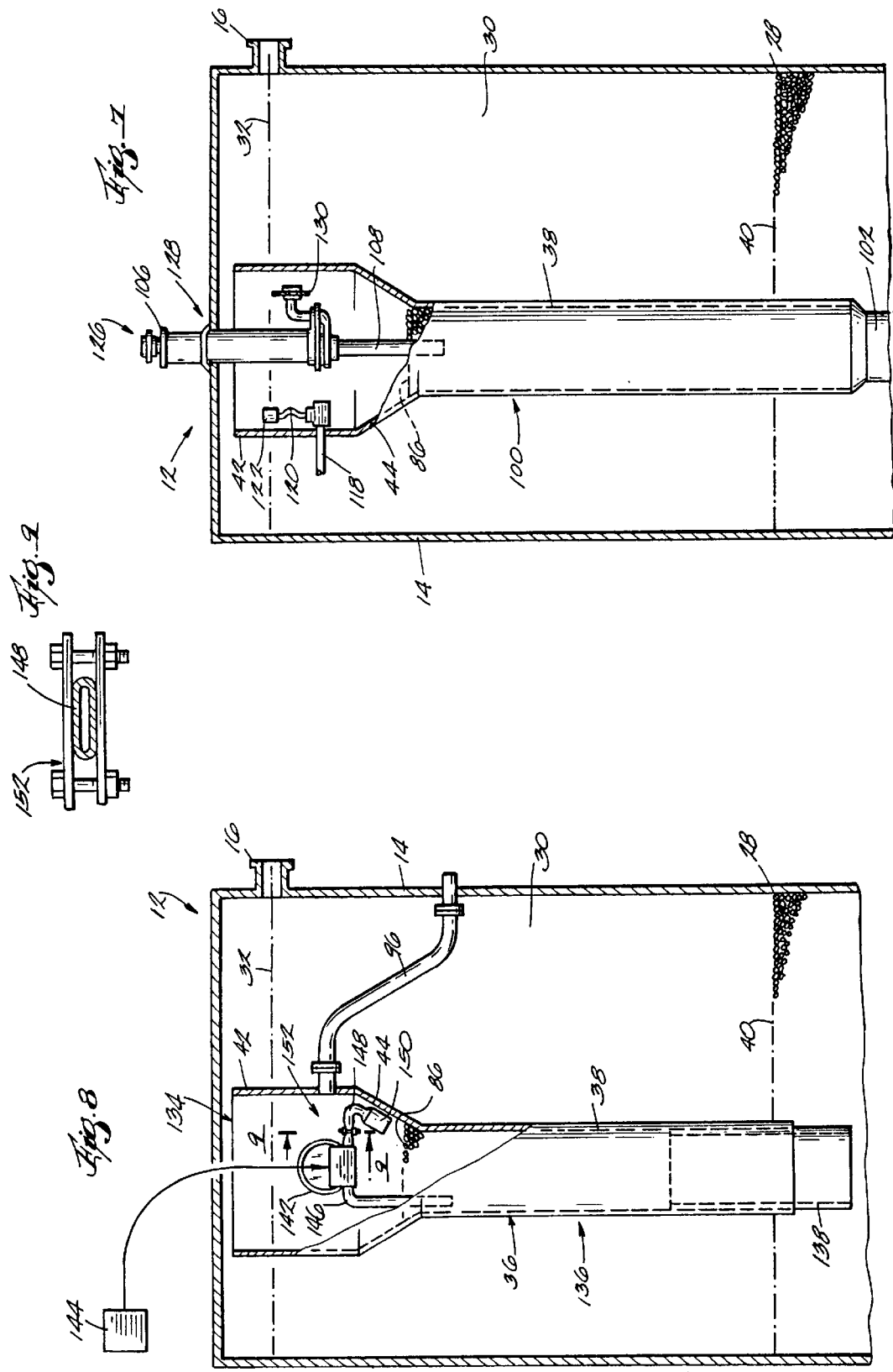

BIOMASS GROWTH CONTROL APPARATUS FOR FLUID BED BIOLOGICAL REACTOR

CROSS REFERENCE TO RELATED APPLICATION

This is a continuation-in-part of U.S. patent application Ser. No. 025,353, filed Feb. 25, 1993, now U.S. Pat. No. 5,372,712.

BACKGROUND OF THE INVENTION

1. Field of the Invention

The invention relates generally to fluid bed biological reactors including bed particles supporting biological material, and more particularly to control apparatus incorporated into fluid bed biological reactors to remove excess biological material therefrom.

2. Reference to Prior Art

Fluid bed reactors are used in the biological processing of waste water. A fluid bed biological reactor includes a reactor tank containing a media bed of particulate solids, such as sand or activated carbon, which serve as a substrate for microorganisms. The waste water is conducted upwardly through the reactor tank at a velocity sufficient to fluidize the media bed, and the microorganisms are nourished under aerobic conditions by impurities in the upflow to process the waste water. The principles of operation of fluid bed biological reactors are provided in the following U.S. patents: U.S. Pat. No. 4,202,774 issued May 13, 1980 to Kos; U.S. Pat. No. 4,182,675 issued Jan. 8, 1980 to Jeris; U.S. Pat. Nos. 4,009,105, 4,009,099 and 4,009,098, all issued Feb. 22, 1977 also to Jeris; and U.S. Pat. No. 3,956,129 issued May 11, 1976 and U.S. Pat. No. 3,846,289 issued Nov. 5, 1974, both to Jeris et al.

Excess biological material (i.e., biological material in excess of that needed for normal reactor operation) must be removed from the reactor to insure its proper and efficient operation, as discussed in U.S. Pat. No. 4,177,144 issued Dec. 4, 1979 to Hickey et al. In the above-mentioned Jeris and Jeris et al. patents, the growth of biological material in the media bed is monitored as a function of bed expansion by a bed level sensing device. When the media bed reaches a predetermined height to activate the sensing device, the bed particles are abraded with a mechanical stirrer to strip excess biological material therefrom. The partially stripped bed particles settle back into the media bed and the excess biological material is carried away in the reactor effluent stream. This is undesirable since sludge dewatering equipment, etc. must in some instances be added to the system downstream of the reactor to separate and remove the excess biological material from the treated effluent stream.

U.S. Pat. No. 4,177,144 illustrates an excess biological growth control system including an agitator arrangement having a mixing blade positioned in a separator column that is emersed in an effluent head above the media bed. Alternatively, the agitator arrangement can include a shearing pump positioned outside of the separator column and either inside or outside of the reactor, as illustrated in U.S. Pat. No. 4,250,033 issued Feb. 10, 1981. In that agitator arrangement liquid and coated bed particles are withdrawn from the separator column and passed through the pump to shear excess biological material from the bed particles before reintroduction into the separator column. Disadvantages associated with this shearing arrangement include exterior piping (if the pump is outside the reactor) and the possible need to disconnect the agitator arrangement from the separator column for maintenance purposes, for example.

Once sheared from the bed particles, excess biological material is confined within the separator column and withdrawn therefrom at a point below the surface of the effluent head. The use of the separator column is intended to prevent sheared biological material from entering the reactor effluent stream. However, in the foregoing arrangement there is a potential for accumulation of biological material in the separator column that can inhibit operation of the control system. A further disadvantage of the control system is the high water content of the sludge (i.e., waste biological material and liquid) withdrawn from the separator column, this high water content necessitating the inclusion of significant dewatering equipment into the control system.

SUMMARY OF THE INVENTION

The invention provides a reactor apparatus including an improved bed growth control apparatus for removing excess biological material from the reactor. The improved control apparatus operates to withdraw sludge from the effluent head surface in a separator column to prevent the accumulation of scum which can result in "surface caking". Also, by withdrawing sludge from the effluent head surface the liquid content of the sludge can be more carefully controlled and minimized to reduce or eliminate associated liquid/biological material separation equipment (e.g., dewatering equipment). The control apparatus is also operated to provide a hydrocyclonic upflow within the separator column to prevent accumulation of biological material in the separator column which can result in "filter caking" below the effluent head surface.

The improved bed growth control apparatus also includes, in some embodiments, an improved agitator arrangement for removing excess biological material from coated media bed particles. The improved agitator arrangement has a shearing mechanism that includes a flow restricting device. The flow restricting device acts as a high rate shear mechanism that develops hydraulic shearing forces by releasing energy developed by an associated pump (i.e., pump head) in a small region of intense turbulence. The flow restricting device can, if desired, be adjustable to impart a desired degree of shear to the coated bed particles without significantly impacting the flow rate that can be processed by the agitator arrangement.

More particularly, the bed growth control apparatus includes a tubular separator column which is emersed in the liquid effluent head in the reactor and which extends downwardly into the media bed. The separator column has a non-constant diameter configuration to provide an upflow velocity profile therein that promotes upward travel of unattached biological material to the effluent head surface while restricting upward travel of heavier media bed particles. To remove the unattached biological material from the effluent head surface in the separator column, the bed growth control apparatus is provided with a telescoping sludge valve having a draw-off port that communicates openly with the effluent head surface. The sludge valve is telescopically adjustable to raise and lower the draw-off port relative to the effluent head surface to control the sludge withdrawal rate and to thereby achieve an upflow velocity in the separator column suitable for the particular application.

The bed growth control apparatus also includes an agitator arrangement that withdraws media bed particles from the separator column, shears excess biological material from those particles, and then returns the partially sheared particles and sheared biological material to the separator column. The returned material is pumped tangentially into the separator column to circulate the contents thereof and to induce the aforementioned hydrocyclonic action in the separator column.

In some embodiments, the agitator arrangement is disconnected from the separator column so that the agitator arrangement can be removed from the reactor tank without the need to first disconnect the agitator arrangement from the separator column. In prior art arrangements, the agitator arrangement had to be first disconnected from the separator column by a diver or other personnel.

In one embodiment of the invention the agitator arrangement includes a loop including a pump, such as a sump pump, and a throttling valve. The throttling valve provides the agitator arrangement with greater shearing capability than if the pump were used alone, and the degree of shear imparted to the coated bed particles by the throttling valve can be controlled by adjusting the valve.

Other features and advantages of the invention will become apparent to those skilled in the art upon review of the following detailed description, claims and drawings.

BRIEF DESCRIPTION OF THE DRAWINGS

FIG. 1 is a partially schematic side elevational view, partially broken away and in section, of a fluid bed reactor apparatus including a bed growth control apparatus embodying features of the invention.

FIG. 2 is an enlarged partially cross-sectional view of the control apparatus illustrated in FIG. 1.

FIG. 3 is a view taken along line 3—3 in FIG. 2.

FIG. 4 is an elevational view of the control apparatus illustrated in FIG. 2.

FIG. 5 is a partially schematic side elevational view, partially broken away and in section, of a portion of a fluid bed reactor apparatus including a bed growth control apparatus in accordance with a first alternative embodiment of the invention.

FIG. 6 is a view similar to FIG. 5, but shows the reactor apparatus equipped with a bed growth control apparatus in accordance with a second alternative embodiment of the invention.

FIG. 7 is second view similar to FIG. 5 but showing the reactor apparatus equipped with a bed growth control apparatus in accordance with a third embodiment of the invention.

FIG. 8 is a third view similar to FIG. 5 but showing the reactor apparatus equipped with a bed growth control apparatus in accordance with a fourth embodiment of the invention.

FIG. 9 is a view taken along line 9—9 in FIG. 8

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a reactor apparatus 10 embodying the invention. The reactor apparatus 10 is used to process a liquid, such as waste water, and can, depending on processing requirements, be used alone or in combination with other upstream or downstream treatment devices (not shown) as is understood by those skilled in the art.

As shown in FIG. 1, the reactor apparatus 10 comprises a reactor 12. The reactor 12 includes a columnar reactor tank 14 having a discharge port 16 adjacent its upper end, and a flow distributor 18 or other suitable means for introducing liquid into the reactor tank 14. The flow distributor 18 includes a header member 20 adjacent the base of the reactor tank 14 and an inlet 22 connected to a line 24 for supplying liquid from a remote source. The header member 20 is manifolded to a plurality of nozzle studded lateral pipes 26 which evenly distribute the incoming liquid throughout the cross-section of the reactor tank 14.

In the illustrated arrangement the reactor 12 is a fluid bed biological reactor and includes a media bed 28 which is contained in the reactor tank 14 and which is fluidized by a sufficient upward flow of liquid. The bed 28 is comprised of particulate solids 28a, preferably granular activated carbon, which act as carriers to support biological material which is seeded thereon. The particular biological material (or "bugs") employed can be selected to accomplish the particular processing objectives.

The reactor 12 is operated by pumping liquid from the line 24, the liquid typically being first subjected to an upstream oxygenation process, into the reactor tank 14 through the flow distributor 18 at a rate sufficient to fluidize the media bed 28. As the liquid passes through the fluidized media bed 28 the biological material therein, under aerobic conditions, consumes or neutralizes the unwanted impurities in the liquid to produce treated effluent. The treated effluent forms a liquid effluent head 30 above the media bed 28. In the illustrated arrangement, the level of the effluent head surface 32 is controlled by the discharge port 16 which withdraws treated effluent for further downstream treatment or for discharge into the environment. The biological action within the reactor 12 also produces biological cellular growth.

To control biological growth and media bed expansion resulting therefrom, the reactor apparatus 10 is provided with means for removing excess biological material from the reactor 12. In the illustrated arrangement, such means effects hydraulic shearing and includes a bed growth or biomass control apparatus 34. The control apparatus 34 includes a biomass control tube or separator column 36 emersed in the effluent head 30 and supported in the reactor 12 by suitable means such as brackets (not shown). The separator column 36 has a cylindrical lower or bottom section 38 extending downwardly preferably below the level of the media bed 28 when fluidized, that level being indicated by the reference numeral 40. The separator column 36 also includes a larger diameter cylindrical upper or top section 42 extending above the effluent head surface 32, and a frustoconical intermediate section 44 converging downwardly from the upper section 42 to the lower section 38.

To separate excess biological material from the particulate solids, the control apparatus 34 is provided with an agitator apparatus 46 associated with the separator column 36. In the embodiment illustrated in FIG. 1, the agitator apparatus 46 includes a biomass pump 48, such as a centrifugal pump for example, or other suitable means for shearing excess biological material from the particulate solids. The agitator apparatus 46 also includes means such as a suction conduit 50 for withdrawing particulate solids having excess biological material thereon from the separator column 36. The suction conduit 50 includes an elbow section 52 (FIGS. 2 and 3) having an downwardly opening inlet 54 that is concentric with the separator column 36 and that communicates directly with the fluidized media bed 28.

The agitator apparatus 46 is also provided with means for returning the partially sheared particulate solids and the sheared biological material generated by the biomass pump 48 to the separator column 36. For reasons more fully explained below, it is preferred that the sheared matter be returned tangentially to the separator column 36. Accordingly, in the illustrated arrangement the return means includes a return conduit 56 having an end portion 58 extending tangentially from the separator column 36 (See FIG. 3) so that the sheared matter introduced into the separator column 36 is given a tangential velocity.

The control apparatus 34 also includes means communicating with the effluent head surface 32 for withdrawing the sheared excess biological material (indicated by reference numeral 28b in FIG. 1) generated by the biomass pump 48 from the separator column 36. While various means for withdrawing the sheared excess biological material can be employed, in the illustrated arrangement such means includes a telescoping sludge valve 60. As shown in FIGS. 1 and 2, the sludge valve 60 is positioned in the separator column 36 above the fluidized bed level 40. The sludge valve 60 includes a vertically extending conduit or tube 62 having a vertically extending draw-off opening or port 64 formed by a V-shaped notch extending downwardly from the upper end of the tube 62. The draw-off port 64 communicates with the effluent head surface 32 and acts as an overflow weir to withdraw sludge therefrom. The vertical position of the draw-off port 64 is adjustable by telescoping the tube 62, such as with a manually operable adjustor rod 66. To increase and decrease the flow rate of sludge withdrawn from the separator column 36 the tube 62 is lowered and raised, respectively, to vary the area of the draw-off port below the effluent head surface 32.

The sludge valve 60 includes a lower elbow section 68 (FIG. 2) extending outside of the separator column 36 and communicating with a biomass waste line 70 that is preferably oversized to accommodate the thickness of the sludge. The waste line 70 is provided with a suitable valve 72 which effectively operates to open and close the sludge valve 60 by opening and closing the line 70. The waste line 70 delivers the sludge to dewatering equipment or other suitable processing equipment, or to a disposal site. The liquid constituent of the sludge, if separated, can thereafter be returned to the reactor 12 or otherwise disposed of.

The sludge valve 60 is operable to control upflow velocity in the separator column 36 by withdrawing more or less sludge through the draw-off port 64. In particular, the sludge valve 60 is adjustable to vertically position the draw-off port 64 relative to the effluent head surface 32 to set a desired sludge removal rate. In a preferred embodiment of the invention, the sludge valve 60 is adjusted so that the ratio of the vertical area of the draw-off port 64 below the effluent head level 32 to the horizontal area of the bottom section 38 of the separator column 36 is at least 10% greater than the ratio of the vertical area of the discharge port 16 below the effluent head level 32 to the horizontal area of the reactor tank 14. This adjustment setting provides sufficient upflow velocity in the separator column 36 to ensure that the fluidized bed level within the separator column 36 is as great as, and preferably slightly greater than, the fluidized bed level 40 outside of the separator column 36 so that the media bed 28 is drawn into the separator column 36.

During reactor operation the control apparatus 34 can be continually or intermittently operated, as desired for the particular application in which the control apparatus 34 is employed. For example, for intermittent automatic operation, an optical sensor (not shown) or other suitable sensing device can be provided for monitoring media bed expansion or other condition indicative of excess biological growth in the reactor 12. When the media bed 28 reaches proportions indicating excessive biological growth, the optical sensor can signal a control unit (not shown) to activate the control apparatus 34 by starting the biomass pump 48 and opening the valve 72.

When the control apparatus 34 is operational, the sludge valve 60 is adjusted to provide an upflow velocity in the separator column 36 between the settling velocities of biological material-laden particulate solids and sheared biological material. The sludge valve 60 is preferably optimally set to induce an upflow velocity high enough to draw the media bed 28 into the lower section 38, but not so high as to unnecessarily dilute sludge withdrawn from the effluent head surface 32 or to withdraw lighter bed particles from the reactor 12. Thus, some experimentation may be required to achieve an optimum setting. To aid in this regard and to increase the operating range of the control apparatus 34, the top section 42 is enlarged to defluidize the media bed 28 should it rise to that level. This reduces the loss of light particulate solids from the reactor 12.

As the media bed 28 is drawn upwardly into the separator column 36, the biomass pump 48 generates partially sheared particulate solids and sheared biological material which is returned to the bottom section 38 with the aforementioned tangential velocity. That tangentially directed flow combines with the upflow in the separator column 36 to produce a swirling or hydrocyclonic upflow. This circulates the media bed constituents in the separator column 36 to prevent the accumulation of biological material therein which, in prior art arrangements, can accumulate to a degree disruptive of upflow in the separator column 36. After introduction into the separator column 36, the sheared biological material ascends with the upflow and collects on the effluent head surface 32 before being washed into the draw-off port 64 to prevent any significant scum accumulation. Also, by withdrawing sludge from the effluent head surface 32 the liquid content of that sludge can be more closely controlled so as to require less processing (i.e., dewatering) to separate the biological and liquid components of the sludge.

In FIG. 5, the reactor 12 is shown equipped with a biomass control apparatus 76 in accordance with a second embodiment of the invention. As shown in FIG. 5, the biomass control apparatus 76 includes an agitator apparatus or circuit 78 that employs suitable pumping means such as pump 48 for inducing flow through the circuit 78. The agitator circuit 78 also includes a withdrawal or suction line 82 into which particulate solids 28a from the bed 28 are drawn when the pump 48 is activated. The suction line 82 includes an end section 84 that extends downwardly into the separator column 36 from the top of the reactor. As shown in FIG. 5, the suction line end section 84 extends slightly below the top of the bottom section 38 of the separator column 36, and when the pump 48 is activated the bed 28 is expected to rise to the level indicated by reference numeral 86. For reasons more fully explained below, the suction line end section 84 is completely disconnected from the separator column 36.

The agitator circuit 78 also includes a return line 88 for returning material drawn from the bed 28 back to the separator column 36. The return line 88 has an end section 90 that extends downwardly into the separator column 36 from the top of the reactor 12 and that is provided with a downcomer tube 92. The downcomer tube 92 provides an expanded area section to minimize turbulence when the material withdrawn from the separator column 36 by the agitator circuit 78 is returned. The return end section 90 is, like the withdrawal end section 84, completely disconnected from the separator column 36. Thus, the entire agitator circuit 78 is maintained separate from the separator column 36 so the that agitator circuit 78 can be removed from the reactor 12 for repair or maintenance without the need to first disconnect the agitator circuit 78 from the separator column 36.

To induce shear in the agitator circuit 78 in excess of that produced directly by the pump 48 to achieve greater removal of excess biological material from the particulate solids 28a, the agitator apparatus 78 also includes a flow constricting device. The flow constricting device serves as a high rate shear mechanism and develops hydraulic shearing forces by extracting energy developed by the pump and causing that energy to be released in a small region of intense turbulence. In the arrangement illustrated in FIG. 5 the flow constricting device is adjustable and includes a throttling valve 94 positioned in the return line 88, although in other arrangements it could also be placed in the withdrawal line 82.

By selectively opening and closing the throttling valve 94 a greater, more controllable amount of shear can be imparted to the coated bed particles passed through the agitator circuit 78 than if the pump 48 were used alone. That amount of shear is easily adjusted in the field for optimum performance and is substantially independent of pump selection or piping size.

To remove sheared biological material 28b from the separator column 36, a waste hose 96 communicating with the interior of the separator column 36 is provided. Unlike the telescoping sludge valve 60, the inlet to the waste hose 96 is positioned beneath the effluent head 32.

Illustrated in FIG. 6 is a biomass control apparatus 98 in accordance with a third embodiment of the invention. The biomass control apparatus 98 is mounted on the reactor tank 14 and includes a modified separator column 100 that includes a bottom section extension 102 extending downwardly into the bed 28 from the bottom section 38. The bottom section extension 102 has a diameter that is less than the diameter of the bottom section 38 to trigger movement of the bed 28 into the separator column 36 following a period in which the biomass control system 98 is deactivated, as is further explained below.

To induce upward flow in the separator column 100 and to remove sludge therefrom, the biomass control apparatus 98 is provided with a waste withdrawal line 118. The withdrawal line 118, like line 96 (FIG. 5), draws from below the effluent head surface 32. However, withdrawal line 118 also includes a scum tube 120 supported by a float 122 to withdraw scum directly from the effluent head surface 32.

The biomass control apparatus 98 also includes a modified agitator circuit 104 that includes a sump pump 106, such as a Warman SP model or equivalent, for example. While the sump pump 106 can be replaced with other pumping means, the use of a sump pump is advantageous since it is inexpensive to operate and maintain. The sump pump 106 is supported within the reactor tank 14 to reduce associated piping. In the particular arrangement illustrated in FIG. 6, the sump pump 106 is positioned within the separator column 100 to further reduce the piping associated therewith. A vertical suction conduit 108 extends downwardly from the sump pump 80 to withdraw coated particulate solids from the media bed 28.

The agitator circuit 104 also includes a withdrawal line 110 having an associated downcomer tube 112 that has an outlet 114 angled to discharge the output of the agitator circuit 104 toward the side of the separator column 100 to further reduce turbulence. Like the agitator circuit 78 (FIG. 5), the agitator circuit 104 is completely separated from the separator column 100 so that it can be removed from the reactor tank 14 without the need to first disconnect it from the separator column 100.

To initiate operation of the biomass control apparatus 98, liquid is drawn through the waste line 118 to induce upward movement of the media bed 28 into the separator column 100. To this end, an increased upward velocity is created in the bottom section extension 102 due to its narrowed diameter relative to the remainder of the separator column 100. This helps trigger movement of the bed 28 back into the separator column 100. In particular, it is preferred that the passage defined by the bottom section extension 102 have a horizontal cross-sectional area between 50% and 85% of the horizontal cross-sectional area of the passage defined by the bottom section 38. Applicant has found that sizing the bottom section extension within that range provides desired results.

Following entry of the media bed 28 into the separator column 100, the upflow velocity profile within the separator column 100 is preferably maintained within certain parameters. In particular, the upward liquid velocity in the bottom section extension 102 should be greater than the buoyant velocity of particulate solids carrying excess biological material and less than the buoyant velocity of particulate solids that have been subjected to shearing. This inhibits bridging or clogging of the separator column 100 by permitting sheared particulate solids to make their way downwardly to exit the separator column 100, while inducing particulate solids laden with extra biological material to ascend into the separator column 100. Also, the upflow velocity in the bottom section 38 should be sufficient to fluidize the bed material 28 therein. This encourages further scrubbing or abrading of the particulate solids 28a following their passage through the agitator circuit 104 to remove any remaining excess biological material. In particular, it is desired that the fluidization velocity in the bottom section 38 of the separator column be maintained at at least the same velocity as the fluidization velocity in the reactor and at most 150% of the fluidization velocity in the reactor.

Finally, the upflow velocity in the top section 42 of the separator column 100 should be less than the buoyant velocity of the particulate solids carrying excess biological material to prevent those solids from being washed out of the system through the waste line 118.

Illustrated in FIG. 7 is a biomass control apparatus 126 in accordance with a third embodiment of the invention. The biomass control apparatus 126 is similar to control apparatus 98 (FIG. 6), but includes a modified agitator circuit 128 that is more compact than agitator circuit 104 (FIG. 6). Agitator circuit 128 includes an orifice plate 130 that provides a restriction orifice to replace the adjustable throttling valve 94.

Illustrated in FIG. 8 is a biomass control apparatus 134 in accordance with a fourth embodiment of the invention. The biomass control apparatus 134 includes a separator column assembly 136 that includes the separator column 36 of FIG. 5 and a tubular bottom extension 138 that is telescopically received in the bottom section 38. The bottom extension 138 permits the separator column assembly 136 to be used as separator column 100 (FIG. 6), and can be retrofitted to separator column 36.

The biomass control apparatus 134 also includes an agitator circuit 140 that preferably rests within the separator column assembly 136 on brackets or other supports (not shown). Thus, the biomass control apparatus 134 is removable from the reactor tank 14 without the need to employ a diver or other personnel to enter the reactor tank 14 to physically disconnect the control apparatus 134 from the separator column assembly 136.

As shown in FIG. 8, the agitator circuit 140 includes a diaphragm pump 142 that is supplied with air from an outside air source 144. The agitator circuit 140 also includes a withdrawal line 146 and a return line 148 including an enlarged outlet 150 to minimize turbulence caused within the separator column assembly 136. The return line 148 is also provided with a hose clamp 152 (FIG. 9) to constrict the return line 148 and induce shear in a manner similar to the throttling valve 94 (FIGS. 5 and 6) and the orifice plate 130 (FIG. 7).

While in the foregoing embodiments of the invention the biomass control apparatus 34, 76, 98, 126 and 134 are employed in a fluid bed biological reactor 12, it should be understood that control apparatus embodying the invention could be used in other types of reactors for removing excess media material from bed particles.

Other features and advantages of the invention will be set forth in the following claims.

I claim:

1. A reactor apparatus comprising
a reactor for processing a liquid, said reactor including a reactor tank containing a bed, said bed including particulate solids, and material supported on said particulate solids,
a tubular separator column supported within said reactor tank, said separator column extending upwardly from said bed, and
an agitator apparatus for agitating the particulate solids, said agitator apparatus including an agitator line extending into said reactor tank, said agitator line extending downwardly into said separator column, and said agitator line being communicable with said bed, a pumping means in said agitator line for drawing particulate solids from said bed into said agitator line, and adjustable means in said agitator line for shearing excess amounts of said material from said particulate solids drawn into said agitator line,
wherein said agitator apparatus is separated from said separator column so that said agitator apparatus is removable from said reactor tank without first being disconnected from said separator column.

2. A reactor apparatus comprising
a reactor for processing a liquid, said reactor including a reactor tank containing a bed, said bed including particulate solids, and material supported on said particulate solids, a tubular separator column supported within said reactor tank, said separator column extending upwardly from said bed, and
an agitator apparatus for agitating the particulate solids, said agitator apparatus including an agitator line, said agitator line including a suction line portion extending downwardly into said separator column, and a return line portion extending downwardly into said separator column, a pumping means in said agitator line for drawing said particulate solids and said material supported thereon from said separator column and into said agitator line through said suction line portion and for returning said particulate solids and said material to said separator column through said return line portion, and a flow constricting device in said agitator line for inducing shear so that excess amounts of said material is sheared from said particulate solids drawn into said agitator line, each of said agitator line, said pumping means, and said flow constricting device being contained within said separator column which is itself within said reactor tank, and wherein said agitator apparatus is separated from said separator column so that said agitator apparatus is removable from said reactor tank without first being disconnected from said separator column.

3. A reactor apparatus comprising
a reactor for processing a liquid, said reactor including a reactor tank containing a bed, said bed including particulate solids, and material supported on said particulate solids,
a tubular separator column supported in said reactor tank, and
means for separating excess amounts of said material from said particulate solids, said means for separating excess amounts of said material from said particulate solids including an agitator circuit for agitating said particulate solids, said agitator circuit being supported in said reactor tank, said agitator circuit including a bed withdrawal conduit communicable with said bed and extending into said separator column, a return conduit, and means connected between said withdrawal and return conduits for shearing excess amounts of said material from said particulate solids, and said agitator circuit being separated from said separator column so that said agitator circuit is removable from said reactor tank without disconnection from said separator column.

4. A reactor apparatus as set forth in claim 3 wherein said means for shearing excess amounts of said material from said particulate solids includes a pump.

5. A reactor apparatus as set forth in claim 4 wherein said pump is positioned within said separator column.

6. A reactor apparatus as set forth in claim 5 wherein said pump is positioned concentrically within said separator column.

7. A reactor apparatus as set forth in claim 3 wherein said means for shearing excess amounts of said material from said particulate solids includes a flow restricting device, said flow restricting device being positioned within said separator column.

8. A reactor apparatus as set forth in claim 3 wherein said agitator circuit is positioned entirely within said separator column.

9. A reactor apparatus as set forth in claim 3 wherein said means for shearing excess amounts of said material from said particulate solids includes a pump, wherein said separator column includes a bottom section, said bottom section defining a cross-sectional opening area, and said bottom section including means for inducing movement of said bed into said separator column following pump activation, said means for inducing movement of said bed into said separator column including a bottom section extension, said bottom section extension defining a cross-sectional opening area smaller than said cross-sectional opening area of said bottom section, and wherein said bottom section extension is telescopically received in said bottom section.

10. A reactor apparatus comprising
a reactor for processing a liquid, said reactor containing a bed, said bed including particulate solids, and material supported on said particulate solids,
a separator column supported in said reactor, said separator column including a bottom section, said bottom section defining a cross-sectional opening area, and said bottom section including a bottom section extension telescopically received in said bottom section, said bottom section extension defining a cross-sectional opening area smaller than said cross-sectional opening area of said bottom section, a means for separating excess amounts of said material from said particulate solids, said means for separating excess amounts of said material from said particulate solids including an agitator circuit for agitating the particulate solids, said agitator circuit being supported on said reactor, said agitator circuit including a bed withdrawal conduit communicable with said bed and extending into said separator column, a return conduit, and means connected between said withdrawal and return conduits for shearing excess amounts of said material from said particulate solids, and said agitator circuit being separated from said separator column so that said agitator circuit is removable from said reactor without disconnection from said separator column.

* * * * *